US009092305B1

(12) United States Patent
Blott et al.

(10) Patent No.: US 9,092,305 B1
(45) Date of Patent: Jul. 28, 2015

(54) MEMORY INTERFACE CIRCUIT

(75) Inventors: Michaela Blott, Malahide (IE); Hamish T. Fallside, Monte Sereno, CA (US)

(73) Assignee: XILINX, INC., San Jose, CA (US)

( * ) Notice: Subject to any disclaimer, the term of this patent is extended or adjusted under 35 U.S.C. 154(b) by 335 days.

(21) Appl. No.: 13/447,734

(22) Filed: Apr. 16, 2012

(51) Int. Cl.
*G06F 12/00* (2006.01)
*G06F 12/02* (2006.01)
*G06F 3/06* (2006.01)

(52) U.S. Cl.
CPC *G06F 12/00* (2013.01); *G06F 3/06* (2013.01); *G06F 12/02* (2013.01)

(58) Field of Classification Search
CPC ....................................................... G06F 12/00
USPC .................................................. 711/100–200
See application file for complete search history.

(56) References Cited

U.S. PATENT DOCUMENTS

| 7,127,574 | B2 * | 10/2006 | Rotithor et al. ............... 711/158 |
| 2005/0240745 | A1 * | 10/2005 | Iyer et al. ...................... 711/167 |
| 2007/0130401 | A1 * | 6/2007 | Baker et al. ...................... 710/62 |
| 2011/0090805 | A1 * | 4/2011 | Chen .............................. 370/252 |
| 2011/0255339 | A1 * | 10/2011 | Kim et al. ................ 365/185.11 |

* cited by examiner

*Primary Examiner* — Cheng-Yuan Tseng
*Assistant Examiner* — Zubair Ahmed
(74) *Attorney, Agent, or Firm* — LeRoy D. Maunu (57) ABSTRACT

In one embodiment, a circuit for communicating with a memory is provided. The circuit includes a sorting circuit configured to receive a plurality of read and write transactions. The sorting circuit sorts the write transactions according to respective sizes of data to be written to the memory, and sorts the read transactions according to respective sizes of data to be read from the memory. A selection circuit is configured to select transactions for transmission to the memory, from the sorted read and write transactions, in an order that balances a quantity of data to be written to the memory over a first serial data link with a quantity of data to be read from the memory over a second serial data link. A transmitter is coupled to the selection circuit and is configured to transmit the selected transactions to the memory device on a serial data link.

20 Claims, 7 Drawing Sheets

MEMORY INTERFACE CIRCUIT

FIELD OF THE INVENTION

One or more embodiments generally relate to data storage and retrieval.

BACKGROUND

To reduce the time and investment required for design, debugging, and enhancement, designs may be implemented using programmable integrated circuits (IC). Programmable ICs include a number of logic and routing resources that may be configured to implement a circuit design. Programmable ICs allow a circuit design to be implemented, tested, and revised without realizing the circuit design as an application specific IC (ASIC). In this manner, development time and costs may be reduced.

Many applications, such as high-speed networking applications, require a significant amount of memory (e.g., DRAM) to buffer data for processing. However, such large amounts of memory are generally not available on programmable ICs. To satisfy the memory requirements of the application, several memory blocks may be implemented on a separate IC and a memory controller implemented on the programmable IC to communicate data between logic circuitry of the programmable IC and the external memory over a parallel data bus. However, throughput in this type of memory arrangement may be limited by memory specific timing constraints. Furthermore, many parallel interfaces have to be implemented in order to achieve the required access bandwidth. Ultimately, there are often not enough I/O pins available in a programmable IC package to provide sufficient off-chip bandwidth to external memory.

More recent memory architectures, known as hybrid memory cubes, overcome the input/output (I/O) bottleneck by integrating a memory controller on the same external chip as the memory and providing access through read and write commands packetized on high-speed serial data links. These high-speed serial links offer significantly more off-chip bandwidth than the standard I/Os that are used for the traditional memory interfaces. Furthermore, by offloading the memory controller from the programmable IC, additional resources are freed.

SUMMARY

In one embodiment, a circuit for communicating with a memory is provided. The circuit includes a sorting circuit configured to receive a plurality of read transactions and a plurality of write transactions. The sorting circuit sorts the write transactions according to respective sizes of data to be written to the memory, and sorts the read transactions according to respective sizes of data to be read from the memory. A selection circuit is configured to select from the sorted read and write transactions, transactions for transmission to the memory in an order that balances a quantity of data to be written to the memory over the first serial data link with a quantity of data to be read from the memory over the second serial data link. A transmitter is coupled to the selection circuit and is configured to transmit the selected transactions to the memory device on a serial data link.

In another embodiment, a method for communicating with a memory over serial data links is provided. A plurality of read transaction requests and a plurality of write transaction requests are received from a logic circuit. The write transaction requests are sorted according to respective sizes of data to be written to the memory and the read transaction requests are sorted according to respective sizes of data to be read from the memory. Transaction requests are selected from the sorted read and write transaction requests for transmission to the memory in an order that balances a quantity of data to be written to the memory on a first serial data link with a quantity of data to be read from the memory on a second serial data link. The plurality of read and write transaction requests are transmitted to the memory on the first serial data link in the selected order.

In yet another embodiment, a system is provided. The system includes a memory circuit and an integrated circuit coupled to the memory circuit via first and second serial data links. The integrated circuit includes a logic circuit and a first interface circuit. The interface circuit is configured to receive read and write transaction requests from the logic circuit. The write transaction requests are sorted by the interface circuit according to respective sizes of data to be written by the write transaction requests to the memory circuit over the first serial data link. The read transaction requests are sorted according to respective sizes of data to be read by the read transaction requests from the memory circuit over the second serial data link. The first interface circuit is configured to select transaction requests from the sorted read and write transaction requests in an order that is a function of the sizes of data to be written to the memory circuit by the write transaction requests relative to sizes of data to be read from memory by the read transaction requests. The first interface circuit is configured to transmit the selected transaction requests in the order to the memory circuit on the first serial data link. The memory circuit includes a second interface circuit coupled to the first and second serial data links. The second interface circuit is configured to receive the read and write transaction requests transmitted by the first interface circuit on the first serial data link and schedule the read and write transaction requests for processing as a function of memory addresses indicated by the read and write transaction requests.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which:

FIGS. 4-1 through 4-3 illustrate bandwidth utilization of the serial data links for some various scenarios;

DETAILED DESCRIPTION

Hybrid memory cube architectures overcome memory bottleneck imposed by I/O pin limitations by integrating a memory controller on the same external chip as the memory and communicating via high-speed serial interfaces to the memory rather than using standard I/O. Memory access requests and data are communicated between the programmable IC and the memory controller using unidirectional serial data links. While the serial data links may provide high-speed communication to and from the external memory, it is recognized that the order in which memory access requests and data are transmitted to the memory may cause one or more of the serial downstream data link to be idle and reduce bandwidth utilization. One or more embodiments provide a memory architecture and method that improves network utilization for high-speed serial communication between an IC and an external memory. In one embodiment, a serial data interface circuit is configured to sort and process memory transaction requests in an order that improves operation of the serial data links by balancing an amount of data to be written to the external memory with an amount of data to be read from the external memory.

Figure 1:
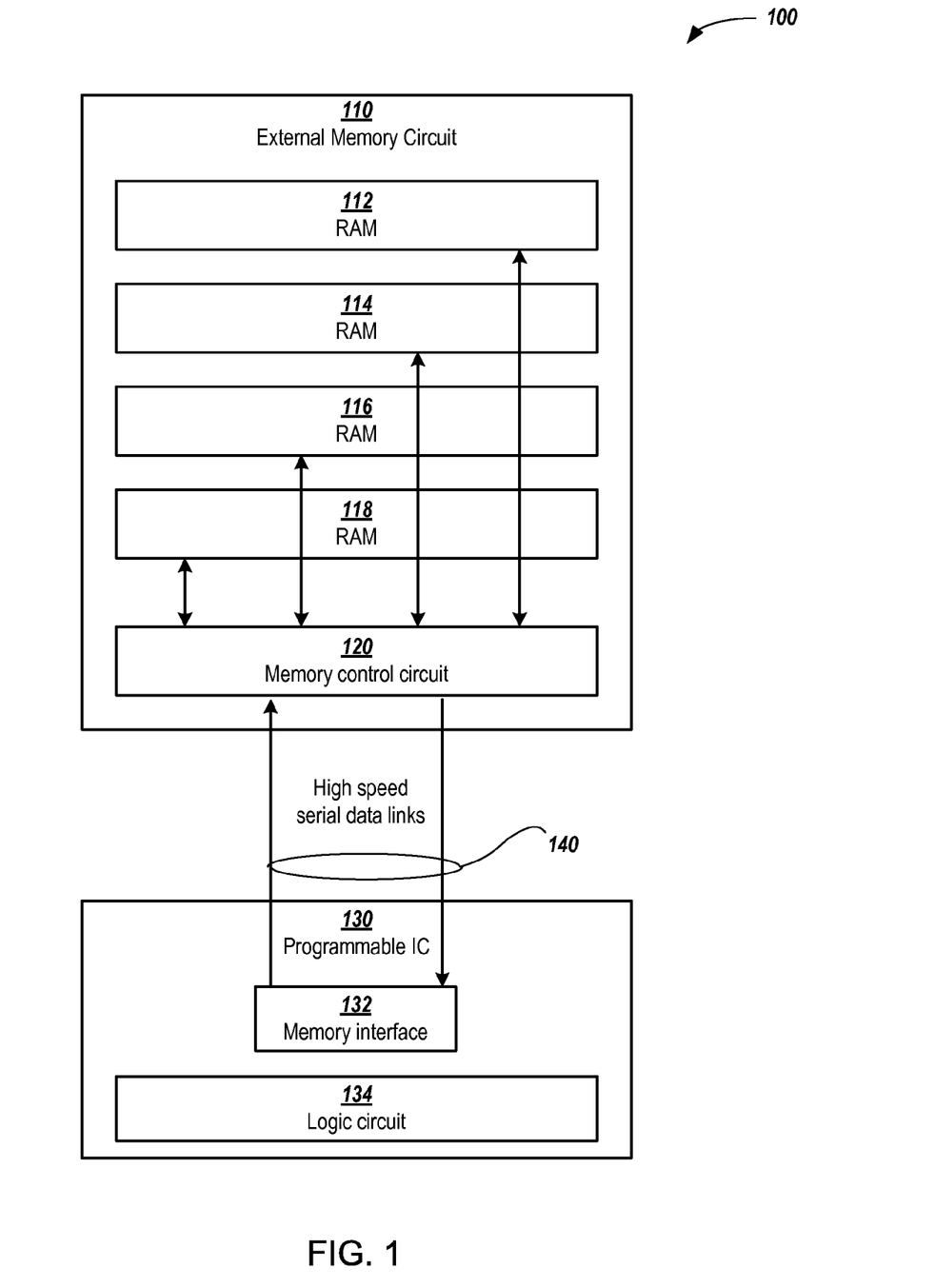
FIG. 1 shows a circuit architecture for serial data communication between an integrated circuit and an external memory unit in accordance with one or more embodiments.

FIG. 1 shows an architecture 100 for serial communication between a programmable integrated circuit 130 and an external memory circuit 110 in accordance with one or more embodiments. The external memory circuit 110 is a hybrid memory cube arrangement having a plurality of memory units 112, 114, 116, and 118, and a memory control circuit 120 configured to receive and process memory access requests from any incoming high-speed serial data link. The memory units are not intended to indicate any particular size or level of memory hierarchy. The memory units may include, for example, memory cells, memory banks, memory slices, etc. The programmable IC 130 includes a memory interface circuit 132 that is configured to transmit and receive data to and from an external memory unit 110 over high-speed serial data links 140.

The serial data links include an upstream data link for communicating data to the external memory 110 from the memory interface 132, and a downstream data link for communicating data from the external memory 110 to the memory interface 132. For ease of explanation, the upstream and downstream data links are primarily described as each consisting of a respective unidirectional serial data line. However, it is recognized that the upstream and downstream data links may each be implemented using several unidirectional serial data lines bundled together.

In one or more embodiments, the memory interface circuit 132 is configured to receive and sort memory transaction requests, which are received from a logic circuit 134, according to an amount of data to be written to or read from the external memory circuit 110 for the memory transaction. For ease of reference, the amount of data to be written to or read for a particular memory transaction request may be referred to as the transaction size. The sorted memory transaction requests are buffered and processed by the memory interface 132 in an order that balances data communicated on the upstream and downstream data links. This order may be selected by the memory interface circuit 132 without regard to memory access conflicts and may, ultimately, be contrary to the order in which the memory transaction requests should be processed by the external memory unit in order to avoid unfavorable access combinations with excessive timing delays. Accordingly, memory access requests may be buffered and again sorted by the memory control circuit 120 into reads and writes for each memory bank. The sorting by the memory control circuit 120 avoids memory conflicts and reduces read-write turnaround times and switching rows within the same bank as those scenarios generally incur the largest delays.

Figure 2:
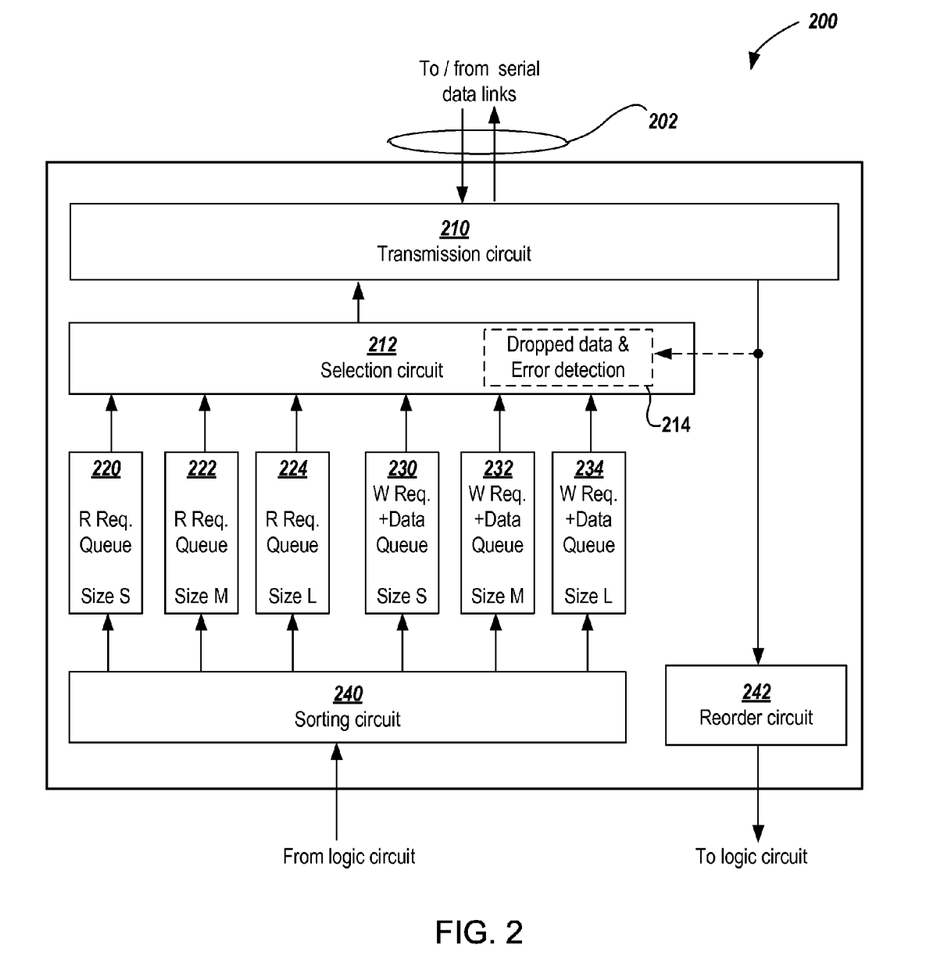
FIG. 2 shows an interface circuit for serial data communication with a memory in accordance with one or more embodiments.

FIG. 2 shows an interface circuit for serial data communication with a memory in accordance with one or more embodiments. The circuit 200 provides an interface for upstream and downstream communication between a logic circuit, implemented, for example, on the same programmable IC as the interface, and an external memory coupled to the interface circuit via high-speed unidirectional serial data links 202. Incoming read requests from the logic circuit are sorted by sorting circuit 240 into buffers (e.g., 220, 222, 224, 230, 232, and 234) that correspond to respective transaction sizes. In this example, read and write requests are respectively sorted into three groups (small, medium, and large) based on the transaction size of each request. It is recognized, however, that memory transaction requests may be sorted into any number of transaction size groups according to implementation requirements.

A selection circuit 212 is coupled to the buffers and is configured to schedule pairs of the read and write transactions, wherein the amount of upstream data to be written to the external memory balances the amount of downstream data to be read from the memory over the high-speed data links. As discussed in more detail with reference to FIGS. 4-1 through 4-4, below, the balancing of read and write transaction sizes helps to increase network utilization and decrease bottlenecks in access to the external memory. After a group of read and write memory transaction requests have been selected, the requests are passed to transmission circuit 210 for formatting according to the protocol used by the serial data links.

In some embodiments the interface circuit 200 may be configured to track write acknowledgements (e.g., ACK/NACK) and requested read data received from the external memory on a downstream data link. In such embodiments, responses are not simply forwarded to the application. Instead, analysis may be performed to detect errors or dropped data packets. For example, in some embodiments, the selection circuit 212 may include circuitry 214 to buffer selected requests and monitor data (e.g., ACK/NACK packets) received from serial data links to detect dropped or erred data packets or requests that need to be retransmitted. In some embodiments the circuitry 214 may cause the selection circuit to retransmit a request in response to determining a data packet has been dropped. In some other embodiments, circuit 214 may provide an error signal to the logic signal that indicates that the request must be retransmitted.

The sorting and selection of memory transaction requests may result in memory transmission requests being transmitted to an external memory in an order that is different from the order in which the requests were received. Furthermore, the memory controller of an external memory may buffer and process the transaction in a different order to reduce memory conflicts. In some embodiments, a reorder circuit 242 is included to reorder downstream data packets to the order in which corresponding transaction requests were received from the logic circuitry. The order of the packets may be determined, for example, by assigning each memory transaction request received from the logic circuitry a respective transaction number, and embedding the corresponding transaction number in each downstream reply from the external memory circuit. In one implementation, the reorder circuit 242 may reorder the responses from the external memory according to the reference number. However, in some other embodiments, responses may simply be forwarded to the logic circuitry, which is configured to receive memory transaction responses out of order.

Figure 3:
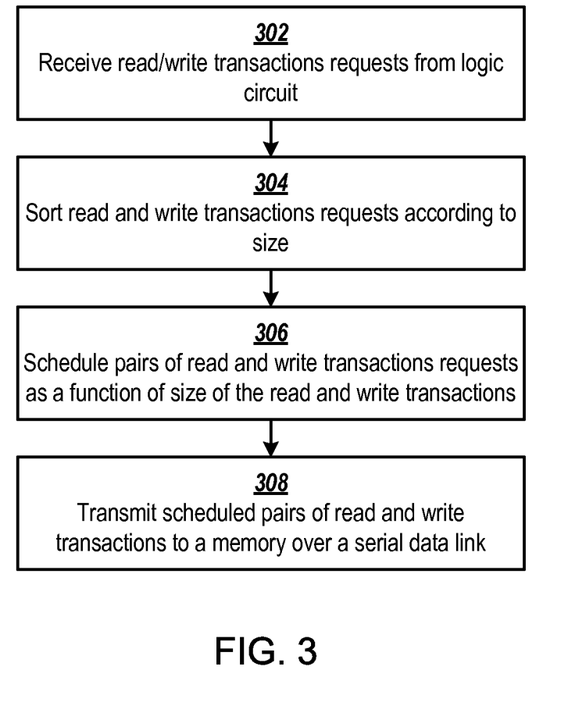
FIG. 3 shows a flowchart for communicating read and write transactions to a memory using serial data links in accordance with one or more embodiments.

FIG. 3 shows a flowchart for communicating read and write transactions between an IC and an external memory over unidirectional serial data links in accordance with one or more embodiments. Read and write memory transaction requests are received from a logic circuit at block 302. The read and write transactions requests are sorted by transaction size and placed in queues at block 304. There are separate queues for read transaction requests and write transaction requests, and each queue stores transactions falling within a respective range of transaction sizes. Read and write transaction requests are scheduled in pairs at block 306, wherein the read transaction request and the write transaction request have approximately the same transaction size. The scheduled pairs are transmitted over a serial data link to a memory unit at block 308.

Figure 41:
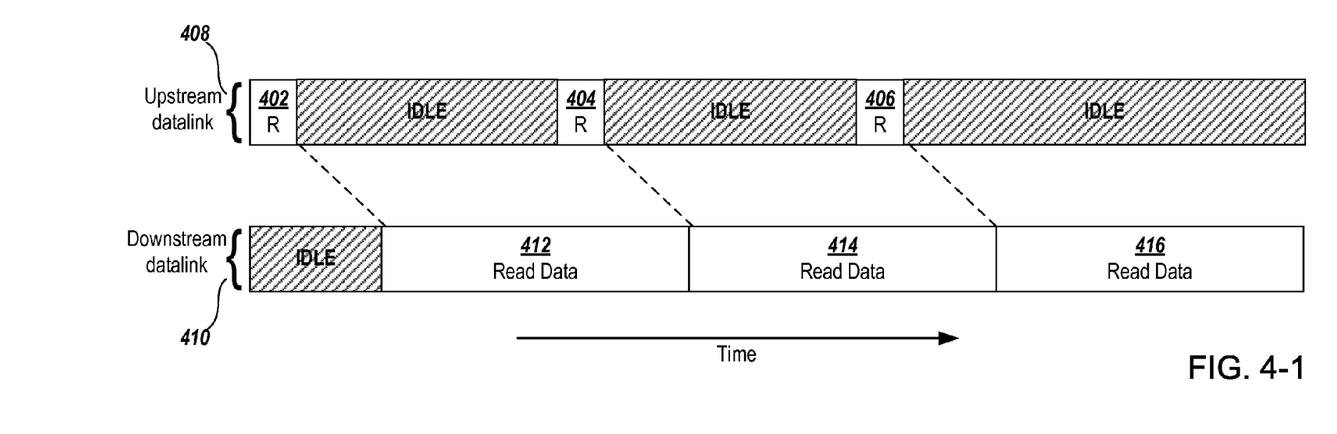
Figure 42:
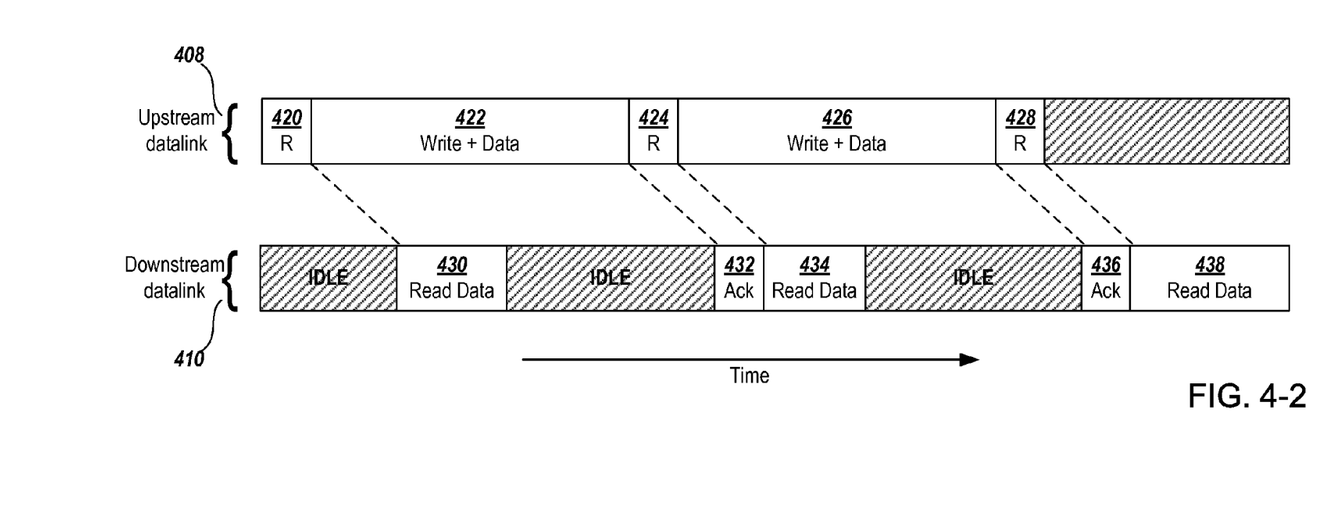
Figure 43:
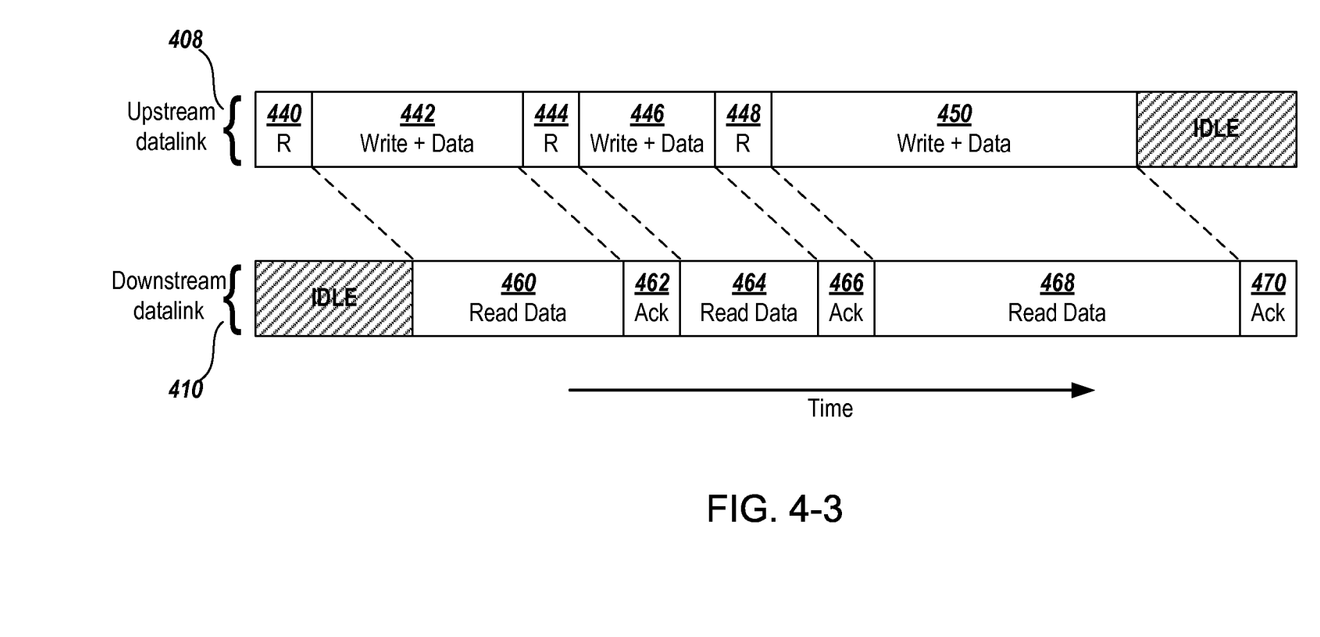

By scheduling pairs of read and write transactions that are roughly the same transaction size, utilization of upstream and downstream serial data links is increased. FIGS. 4-1 through 4-3 illustrate bandwidth utilization of the serial data links for some various combinations of read and write transaction sizes. Each of FIGS. 4-1 through 4-3 shows data messages transmitted on an upstream data link 408 and on a downstream data link 410 over a period of time. Time periods in which the upstream or downstream data links are idle are illustrated as diagonal hashed blocks. The dashed lines between the upstream 408 and downstream 410 data links depict the turnaround time for external memory to process a request transmitted on the upstream data link 408 and respond on the downstream data link 410. FIGS. 4-1 and 4-2 illustrate how imbalance between upstream and downstream data links leads to underutilization of the network bandwidth. FIG. 4-3 shows how utilization of bandwidth can be increased by balancing the load on upstream and downstream data links.

FIG. 4-1 illustrates a sequence of three read transactions requests (402, 404, and 406) transmitted on an upstream serial data link 408 to a memory. In response to each of the read transaction requests, the memory retrieves and transmits the requested data segments (412, 414, and 416) back on a downstream data link 410. In this example, the downstream data link 410 is fully utilized by transmission of the requested data segments (412, 414, and 416) but the bandwidth of the upstream data link 408 is only partially utilized by the transmission of the read requests (402, 404, and 406).

FIG. 4-2 illustrates a sequence of alternating read and write transaction requests transmitted on the upstream serial data link 408 to a memory. In response to each of the read transaction requests (420, 424, and 428), the memory retrieves and transmits the requested data segment (430, 434, and 438) back on the downstream data link 410. In response to each of the write transactions (422 and 426), the external memory controller writes data included in the transaction to memory and transmits an ACK packet back on the downstream data link 410. In this example, bandwidth of the upstream data link 408 is fully utilized, but the read requests do not request enough data to fully utilize the bandwidth of the downstream data link 410. For example, the downstream data link 410 is idle for a significant period between acknowledgement packets (432 and 436) of the write requests transactions and the preceding segment of requested read data (e.g. 430 and 434).

In each of FIGS. 4-1 and 4-2 transaction sizes of the read and write requests are not balanced. As a result, upstream and downstream data are not balanced and at least one of the data links remains underutilized. FIG. 4-3 illustrates a sequence of alternating read transaction requests (440, 444, and 448) and write transaction requests (442, 446, and 450) transmitted on an upstream data link 408 to a memory. The amount of data to be retrieved for the read transaction requests is balanced with the amount of data to be transmitted for the write transaction requests. In response to each of the read transaction requests (440, 444, and 448) on the upstream data link 408, the memory retrieves and transmits the requested data segment (460, 464, and 468) back on the downstream data link 410. In response to each of the write transactions (442, 446, and 450), the memory writes data included in the transaction request to memory and transmits a respective ACK packet (462, 466, and 470) on the downstream data link 410.

In this example, read and write requests are selected in pairs wherein the amount of data transmitted to the memory on the upstream data link 408 for the write transaction is approximately the same as the amount of data transmitted from the memory on the downstream data link 410 for the read transaction. For example, for a first pair of transaction requests (440 and 442) the amount of data 460 to be read from memory is approximately the same as the amount of data to be written to memory by 442. By having the read and write transactions with approximately the same size data transfer, the upstream data link 408 becomes available to transmit the next read request 444 just in time for the requested data to be 464 to be retrieved to keep the downstream data link 410 fully utilized. As a result of the balanced read and write transactions, both the upstream and downstream data links remain fully utilized.

Figure 5:
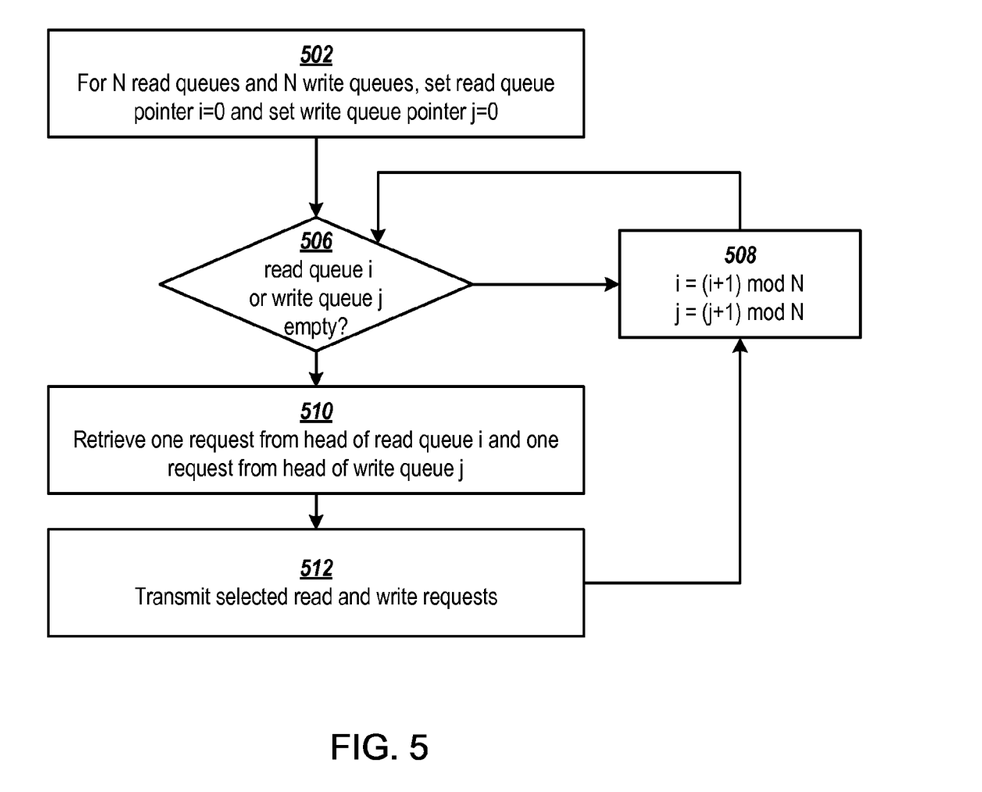
FIG. 5 shows a flowchart of one scheduling process that may be used in accordance with one or more embodiments.

FIG. 5 shows a flowchart of a process for selecting read and write transaction requests in accordance with one or more embodiments. In this example, memory transaction requests are assumed to have been sorted by size into N read queues and N write queues. An index pointer (i) for the set of read queues is set to point to the first read queue (i=0) at block 502. Likewise, an index pointer (j) for the set of write queues is set to point to the first write queue (j=0). In this example, matching read and write requests, are scheduled in pairs from buffers having the same index (i.e., same transaction sizes). If either the read queue referenced by i or the write queue referenced by j is empty, decision block 506 directs the process to block 508 where i and j are incremented to reference the next read queue and write queue. After the last queue index (N) is reached, i and j effectively reset (by the mod operation) to reference the queues having the first index.

If both read queue i and write queue j both contain transaction requests, decision block 506 directs the process to block 510 to retrieve a read transaction and a write transaction from the head of the queues. The selected read and write requests are transmitted at block 512.

By selecting read and write transaction requests from read and write queues having the same ranges of transaction sizes, the amounts of downstream data and upstream data are balanced within a tolerance determined by the transaction size ranges of the queues into which the transaction requests are sorted. By increasing the number of read queues and write queues sorting can be performed to more accurately balance upstream and downstream data.

The scheduling process may be adapted to implement various different scheduling algorithms and/or additional features. For example, in one or more embodiments, the selection circuit may track a difference between scheduled read and write transactions and attempt to make up for any difference in future selection of read and write transaction requests. As another example, two or more smaller read transactions may be combined to have a cumulative transaction size that is the same as a larger write request or vice-versa. As yet another example, queue selection may also be based on age, time-to-live, quality of service priority, or other characteristics of the queued transaction requests.

Figure 6:
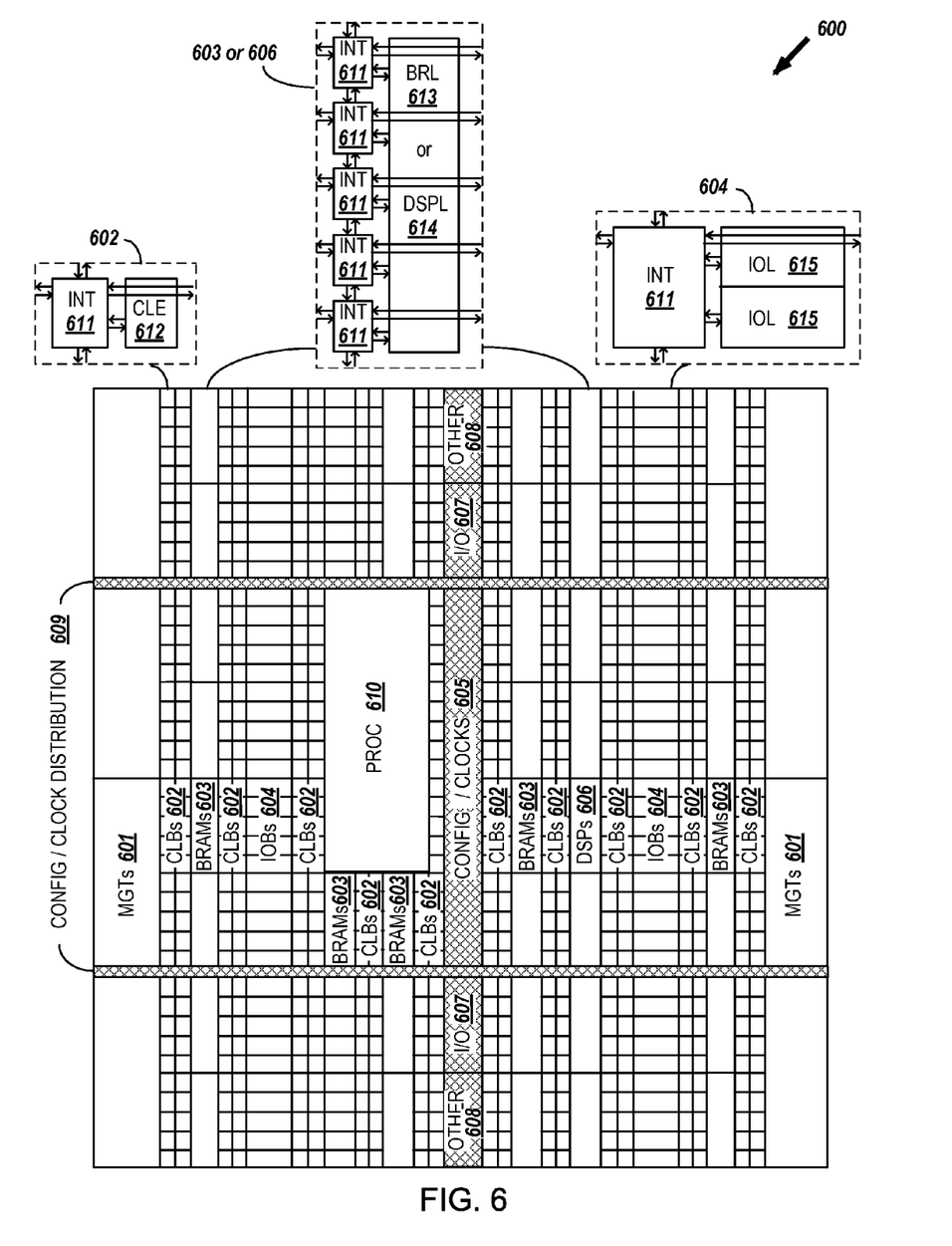
FIG. 6 shows a programmable IC that may be configured in accordance with one or more embodiments.

FIG. 6 shows an example programmable IC that may be configured to interface with an external memory in accordance with one or more embodiments. The illustrated programmable IC is known as a field programmable gate array (FPGA). FPGAs can include several different types of programmable logic blocks in the array. For example, FIG. 6 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), e.g., clock ports, and other programmable logic 608 such as digital clock managers, analog-to-digital converters, system monitoring logic, and so forth. Some FPGAs also include dedicated processor blocks (PROC 610) and internal and external reconfiguration ports (not shown).

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An 10B 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

The embodiments are thought to be applicable to a variety of applications using memory. Other aspects and embodiments will be apparent to those skilled in the art from consideration of the specification. The embodiments may be implemented as one or more processors configured to execute software, as an application specific integrated circuit (ASIC), or as a logic on a programmable logic device, for example. It is intended that the specification and illustrated embodiments be considered as examples only, with a true scope of the invention being indicated by the following claims.

What is claimed is:

1. A circuit for communicating with a memory, comprising:
   a sorting circuit configured and arranged to:
   receive a plurality of read transactions and a plurality of write transactions;
   sort the write transactions according to respective sizes of data to be written by the write transactions to the memory over a first serial data link; and
   sort the read transactions according to respective sizes of data to be read by the read transactions from the memory over a second serial data link;
   a selection circuit coupled to the sorting circuit and configured and arranged to select from the sorted read and write transactions, read and write transactions for transmission to the memory in an order that balances a quantity of data to be written to the memory over the first serial data link with a quantity of data to be read from the memory over the second serial data link; and
   a transmitter coupled to the selection circuit and configured and arranged to transmit the selected ones of the plurality of read and write transactions to the memory device on the first serial data link.

2. The circuit of claim 1, further comprising:
   a plurality of read queues associated with a plurality of transaction size ranges, respectively; and
   a plurality of write queues associated with the plurality of transaction size ranges, respectively;
   wherein the sorting circuit is further configured and arranged to:
   store each read transaction in one of the plurality of read queues having an associated transaction size range for which the size of the data to be read from the memory for the read transaction is in the associated transaction size range; and
   store each write transaction in one of the plurality of write queues having the associated transaction size range for which the size of the data to be written to the memory for the write transaction is in the associated transaction size range.

3. The circuit of claim 2, wherein the selection circuit is configured and arranged to select pairs of the plurality of read and write transactions, each pair including a read transaction and a write transaction that are placed in respective ones of the plurality of read and write queues corresponding to the same one of the plurality of transaction size ranges.

4. The circuit of claim 1, further comprising a reordering circuit configured and arranged to:
   receive segments of read data from the memory, each segment of read data corresponding to a respective one of the plurality of read transactions; and
   provide the segments of read data at an output in an order in which the corresponding read transactions of the plurality of read transactions were received.

5. The circuit of claim 1, wherein the selection circuit is further configured to alternate between selecting a read transaction and selecting a write transaction.

6. The circuit of claim 1, wherein the selection circuit is further configured to: buffer the selected transaction requests;

review acknowledgment data received from the second data link to determine if any of the selected transaction requests was not successfully transmitted; and in response to determining that one of the selected transaction requests was not successfully transmitted, signal the transmitter circuit to retransmit the one of the selected transaction requests to the memory device on the first serial data link.

7. A method for communicating with a memory over serial data links, comprising:

receiving a plurality of read transaction requests and a plurality of write transaction requests from a logic circuit;

sorting the write transaction requests according to respective sizes of data to be written to the memory by the write transaction requests over a first serial data link;

sorting the read transaction requests according to respective sizes of data to be read from the memory by the read transaction requests over a second serial data link;

selecting from the sorted read and write transaction requests, transaction requests for transmission to the memory in an order that balances a quantity of data to be written to the memory on the first serial data link with a quantity of data to be read from the memory on the second serial data link; and transmitting the plurality of read and write transaction requests on the first serial data link in the selected order.

8. The method of claim 7, wherein the transmitting includes, for a write transaction request, transmitting addressing information of the transaction request and data to be written to the memory over the first serial data link.

9. The method of claim 7, wherein:

the selecting transaction requests from the sorted read and write transaction requests includes alternating between selecting a write transaction request and selecting a read transaction request; and the amount of data to be written to memory by each selected write transaction request is approximately equal to an amount of data to be read from memory by a preceding selected read transaction request.

10. The method of claim 7, wherein:

the sorting of the plurality of read transaction requests and write transaction requests includes:

storing each read transaction request in one queue of a first set of queues according to the size of data to be read from the memory for the read transaction request, each queue in the first set of queues corresponding to a respective one of a plurality of transaction size ranges, and the size of data to be read by the read transaction request being within the size range of the one queue of the first set of queues; and storing each write transaction request in one queue of a second set of queues according to the size data to be read from the memory by the write transaction request, each queue in the second set of queues corresponding to a respective one of the plurality of transaction size ranges, and the size of data to be written by the write transaction request being within the size range of the one queue of the second set of queues; and the selecting transaction requests for transmission includes selecting a read transaction request from one queue of the first set of queues and a write transaction request from one queue of the second set of queues, and the transaction size range that corresponds to the one queue of the first set is the same as the transaction size range that corresponds to the one queue of the second set.

11. The method of claim 10, wherein the selecting transaction requests includes:

determining a difference between the amount of data to be read from memory for the selected read transaction request and the amount of data to be written to memory for the selected write transaction request; and selecting a second read transaction request and second write transaction request, based on an amount data to be written to memory for the second write transaction request, an amount of data to be read from the memory for the second read transaction request, and a difference between the amount of data to be read from memory for the first mentioned selected read transaction request and amount data to be written to memory for the first mentioned selected write transaction request.

12. The method of claim 7, wherein the selected order in which the plurality of read transaction requests and the plurality of write transaction requests are selected for transmission is different from a second order in which the plurality of read transaction requests and the plurality of write transaction requests are received from the logic circuit.

13. The method of claim 12, further comprising:

in response to receiving segments of read data corresponding to respective read transaction requests, on the second serial data link, transmitting the segments of read data to the logic circuit according to the second order in which the corresponding read transaction requests were received from the logic circuit.

14. The method of claim 13, wherein:

each read transaction of the plurality of read transaction requests and each write transaction request of the plurality of write transaction requests includes a respective sequence number; and each segment of read data includes the sequence number of the corresponding read transaction request.

15. A system, comprising:

a memory circuit; and an integrated circuit coupled to the memory circuit via first and second serial data links, wherein the integrated circuit includes:

a logic circuit; and a first interface circuit coupled to the logic circuit and configured and arranged to:

receive a plurality of read transaction requests and a plurality of write transaction requests from the logic circuit;

sort the write transaction requests according to respective sizes of data to be written by the write transaction requests to the memory circuit over the first serial data link;

sort the read transaction requests according to respective sizes of data to be read by the read transaction requests from the memory circuit over the second serial data link;

select transaction requests from the sorted read transaction requests and sorted write transaction requests for transmission to the memory circuit in an order that balances a quantity of data to be written to the memory circuit over the first serial link by the write transaction requests with a quantity of data to be read from memory over the second serial link by the read transaction requests; and transmit the selected transaction requests in the order to the memory circuit on the first serial data link; and wherein the memory circuit includes:

a second interface circuit coupled to the first and second serial data links, the second interface circuit configured to:

receive the read transaction requests and the write transaction requests transmitted by the first interface circuit on the first serial data link; and schedule the read and write transaction requests for processing as a function of memory addresses indicated by the read and write transaction requests.

16. The system of claim 15, wherein the first interface circuit includes:
   a plurality of read queues associated with a plurality of transaction size ranges, respectively;
   a plurality of write queues associated with the plurality of transaction size ranges, respectively; and
   a sorting circuit coupled to the plurality of read and write queues and configured and arranged to:
   perform the sorting of the read transaction requests by storing each read transaction request in one of the plurality of read queues having an associated transaction size range for which the size of the data to be read from the memory circuit for the read transaction request is in the associated transaction size range; and
   perform the sorting of the write transaction requests by storing each write transaction request in one of the plurality of write queues having the associated transaction size range for which the size of the data to be written to the memory circuit for the write transaction request is in the associated transaction size range.

17. The system of claim 16, wherein the selection circuit is configured and arranged to select pairs of the plurality of read and write transactions, each pair including a read transaction and a write transaction that are placed in respective ones of the plurality of read and write queues corresponding to the same one of the plurality of transaction size ranges.

18. The system of claim 16, wherein:
   the first interface circuit further includes a selection circuit coupled to the plurality of read queues and the plurality of write queues, and configured and arranged to select groups of transaction requests from the plurality of read queues and plurality of write queues; and
   the amount of data to be written to the memory circuit and amount of data to be written from the memory circuit in each of the selected groups of transaction requests is balanced.

19. The system of claim 18, wherein the selection circuit is further configured to alternate between selecting a read transaction and selecting a write transaction.

20. The system of claim 15, wherein the first interface circuit further includes a reordering circuit configured and arranged to:
   receive segments of read data from the memory circuit, each segment of read data corresponding to a respective one of the plurality of read transaction requests; and
   transmit the segments of read data to the logic circuit in an order in which the corresponding read transaction requests of the plurality of read transaction requests were received from the logic circuit.

* * * * *